(12) United States Patent
Sekar et al.

(10) Patent No.: US 11,042,594 B2
(45) Date of Patent: Jun. 22, 2021

(54) ARTIFICIAL INTELLIGENCE FOR PRODUCT DATA EXTRACTION

(71) Applicant: Hearst Magazine Media, Inc., New York, NY (US)

(72) Inventors: Praveen Sekar, Singapore (SG); Govind Chandrasekhar, Singapore (SG); Ramanan Balakrishnan, Singapore (SG); Srinivasan Kidambi, Singapore (SG); Vinoth Gopinathan, San Francisco, CA (US); Varun Sivamani, San Francisco, CA (US)

(73) Assignee: Hearst Magazine Media, Inc., New York, NY (US)

( * ) Notice: Subject to any disclaimer, the term of this patent is extended or adjusted under 35 U.S.C. 154(b) by 142 days.

(21) Appl. No.: 16/288,059

(22) Filed: Feb. 27, 2019

(65) Prior Publication Data

US 2019/0197063 A1    Jun. 27, 2019

Related U.S. Application Data

(60) Provisional application No. 62/807,445, filed on Feb. 19, 2019.

(51) Int. Cl.
    *G06F 17/00*      (2019.01)
    *G06F 16/951*      (2019.01)
    *G06N 20/00*      (2019.01)
    *G06F 16/955*      (2019.01)
    *G06Q 30/06*      (2012.01)

(52) U.S. Cl.
    CPC .......... *G06F 16/951* (2019.01); *G06F 16/955* (2019.01); *G06N 20/00* (2019.01); *G06Q 30/0627* (2013.01)

(58) Field of Classification Search
None
See application file for complete search history.

(56) References Cited

U.S. PATENT DOCUMENTS

| | | | | |
|---|---|---|---|---|
| 9,049,117 | B1 * | 6/2015 | Nucci | H04L 63/302 |
| 2009/0012842 | A1 * | 1/2009 | Srinivasan | G06F 40/30 |
| | | | | 705/12 |
| 2009/0119268 | A1 * | 5/2009 | Bandaru | G06Q 10/0631 |
| | | | | 705/7.12 |
| 2011/0320414 | A1 * | 12/2011 | Sim | G06F 16/95 |
| | | | | 707/690 |
| 2012/0272160 | A1 * | 10/2012 | Spivack | H04L 51/32 |
| | | | | 715/752 |
| 2013/0110594 | A1 * | 5/2013 | Sinyagin | G06Q 30/02 |
| | | | | 705/14.6 |
| 2014/0114758 | A1 * | 4/2014 | Bentley | G06Q 30/0277 |
| | | | | 705/14.53 |

(Continued)

*Primary Examiner* — Hasanul Mobin
(74) *Attorney, Agent, or Firm* — Knobbe, Martens, Olson & Bear LLP

(57) ABSTRACT

A computer system and method may be used to generate a product catalog from one or more websites. One or more product pages on the websites may be identified and parsed. Attribute information may be identified in each page. Moreover, one or more automated interactions may be performed to generate page variations and identify attribute values. The attribute information and attribute values may be stored as structured data in a database.

20 Claims, 20 Drawing Sheets

(56) References Cited

U.S. PATENT DOCUMENTS

| | | | |
|---|---|---|---|
| 2014/0149105 A1* | 5/2014 | Lamba | G06F 40/279 |
| | | | 704/9 |
| 2015/0332369 A1* | 11/2015 | Nakane | G06Q 30/0623 |
| | | | 705/26.61 |
| 2016/0357408 A1* | 12/2016 | Zavar | G06Q 30/0641 |
| 2017/0046763 A1* | 2/2017 | Pan | G06Q 30/0625 |
| 2017/0302627 A1* | 10/2017 | Lai | G06Q 50/01 |
| 2018/0013720 A1* | 1/2018 | Sachdev | G06Q 10/10 |
| 2018/0137560 A1* | 5/2018 | Chopra | G06Q 30/0643 |
| 2019/0043095 A1* | 2/2019 | Grimaud | G06F 16/906 |
| 2019/0095973 A1* | 3/2019 | Byron | G06Q 30/0627 |
| 2019/0220694 A1* | 7/2019 | Biswas | G06K 9/6202 |

* cited by examiner

Train machine learning model to identify product attributes based on features
621

Select HTML elements from web page, including properties and coordinates
622

Apply machine learning model to the features of the HTML elements to predict whether they correspond to product attributes
623

620

ARTIFICIAL INTELLIGENCE FOR PRODUCT DATA EXTRACTION

CROSS-REFERENCE TO RELATED APPLICATIONS

This application claims the benefit of U.S. Provisional Patent Application No. 62/807,445, filed Feb. 19, 2019, which is hereby incorporated by reference in its entirety.

BACKGROUND

E-commerce websites host a large variety of products that can be purchased. Some of the products have multiple attributes that may apply to a single product, such as size and color. It would be desirable to be able to collect information about products and their attributes on the web in an automated fashion to develop an advantageous dataset containing information about the many products in the world.

BRIEF DESCRIPTION OF THE DRAWINGS

The present disclosure will become better understood from the detailed description and the drawings, a brief summary of which is provided below.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some implementations are implemented by a computer system. A computer system can include a processor, a memory, and a non-transitory computer-readable medium. The memory and non-transitory medium can store instructions for performing methods and steps described herein.

Disclosed embodiments relate to a method and system for crawling a website on a network to identify product pages. The product pages may be scraped by the crawler to obtain product data. Moreover, one or more interactive elements on the product pages may be automatically activated to be able to identify the various attribute variations available for the product, such as size and color. The products, attributes, and attribute values may be extracted and normalized and stored in a structured database for use in applications.

Figure 1:
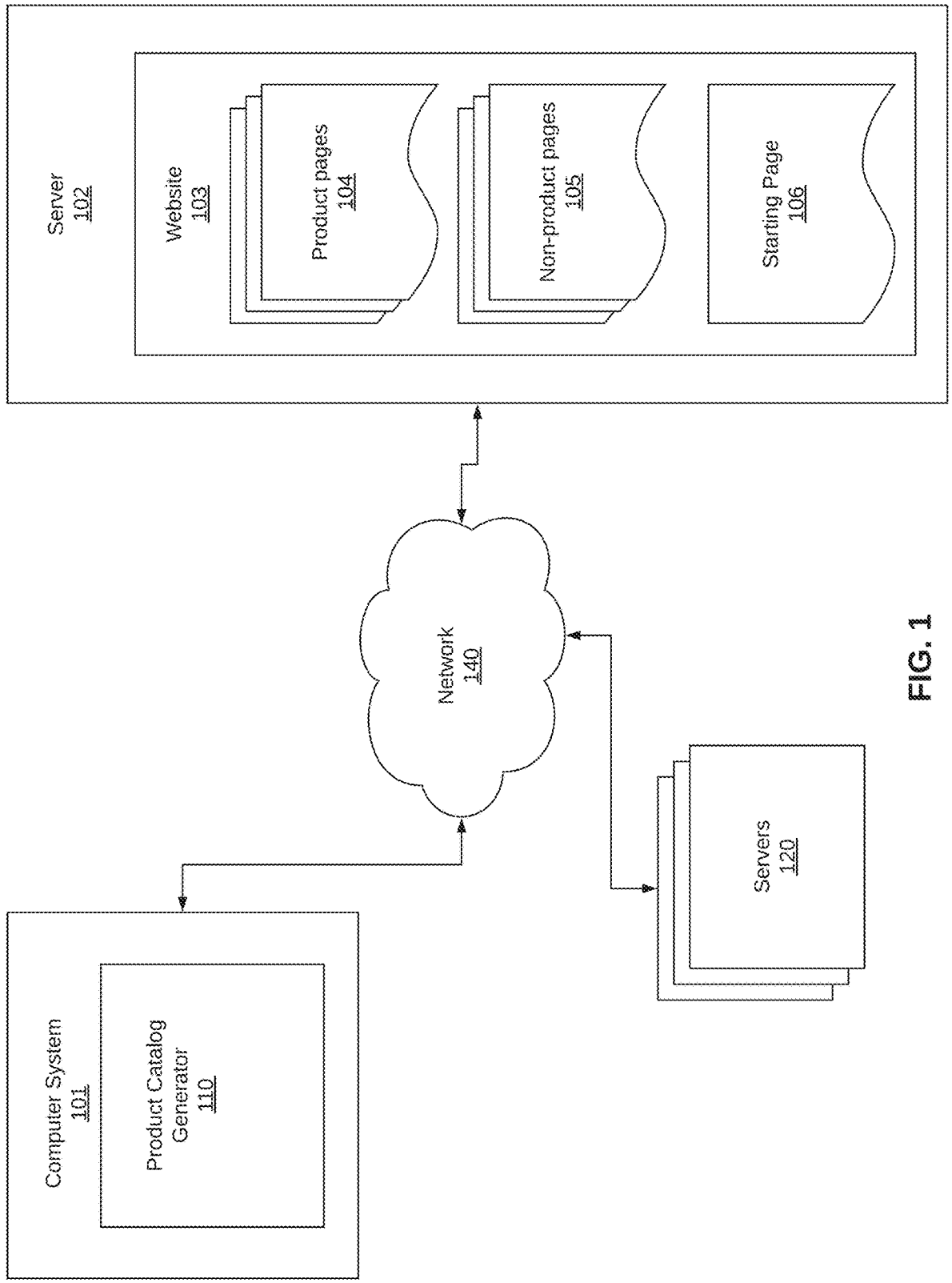
FIG. 1 illustrates an exemplary network environment in which embodiments of the invention may operate.

FIG. 1 illustrates an exemplary network environment in which embodiments of the invention may operate. Network 140 connects a plurality of computer systems. Network 140 may comprise, for example, an intranet, local area network, wide area network, the Internet, public switched telephone network (PSTN), network of networks, or other network. Computer systems on the network 140 may transmit and receive data with other computer systems.

Server 102 may be connected to the network 140 and may serve access to website 103, which may comprise a plurality of web pages including product pages 104, non-product pages 105, and a starting page 106. Each web page may include a location identifier to identify its location on the network 140 and allow retrieval, such as a uniform resource locator (URL). The product pages 104 may provide information about a product. In some embodiments, the product pages 104 allow purchasing the product. In other embodiments, the product pages 104 are informational without including the ability to purchase. Non-product pages 105 do not include information about a product, such as an About page, Careers page, Company History page, Support page, and so on. The starting page 106 serves as a starting point for access to the website 103. In some embodiments, the starting page 106 may be a home page. In other embodiments, the starting page 106 may be an arbitrary web page on the website 103 because it is often the case that any page on a website 103 may be accessed, through a series of links, from any starting webpage.

Computer system 101 may also be connected to the network 140. Computer system 101 may comprise any computing device such as a desktop, server computer, laptop, tablet, mobile device, mobile phone, digital signal processor (DSP), microcontroller, microcomputer, multi-processor, smart device, voice assistant, smart watch, or any other computer. Computer system 101 may comprise product catalog generator 110, which may be a software program stored as instructions on computer-readable media and executable by a processor of the computer system 101. Product catalog generator 110 may comprise software to analyze one or more websites and extract the product data therein to generate a structured database of product data.

Other servers 120 may also reside on network 140 and be accessible over the network. Although the computer system 101, server 102, and other servers 120 are illustrated as single devices, it should be understood that they may comprise a plurality of networked devices, such as networked computer systems or networked servers. For example, the networked computer systems may operate as a load balanced array or pool of computer systems.

Figure 2A:
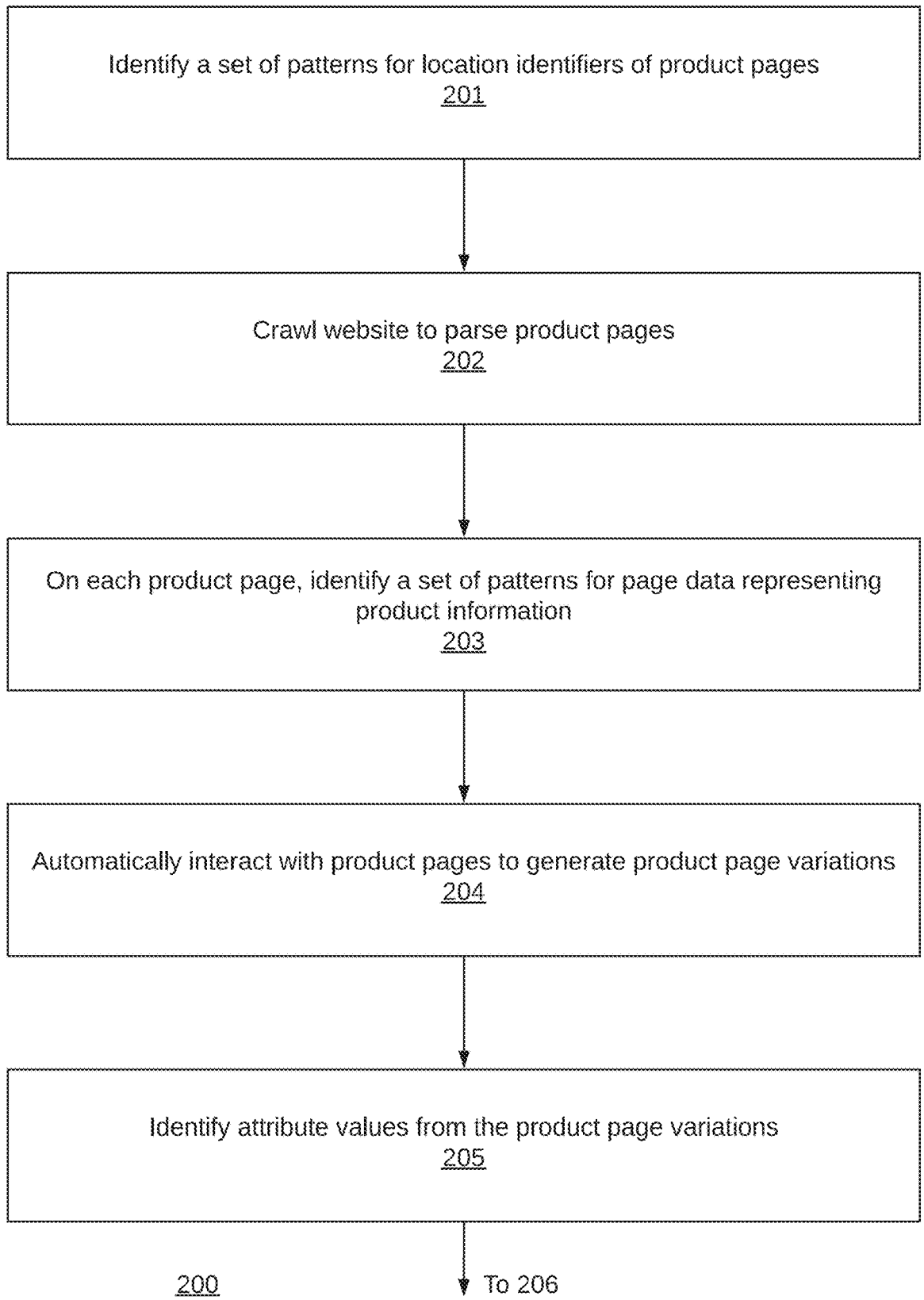
FIGS. 2A-B illustrate an exemplary method for generating a product catalog.
Figure 2B:
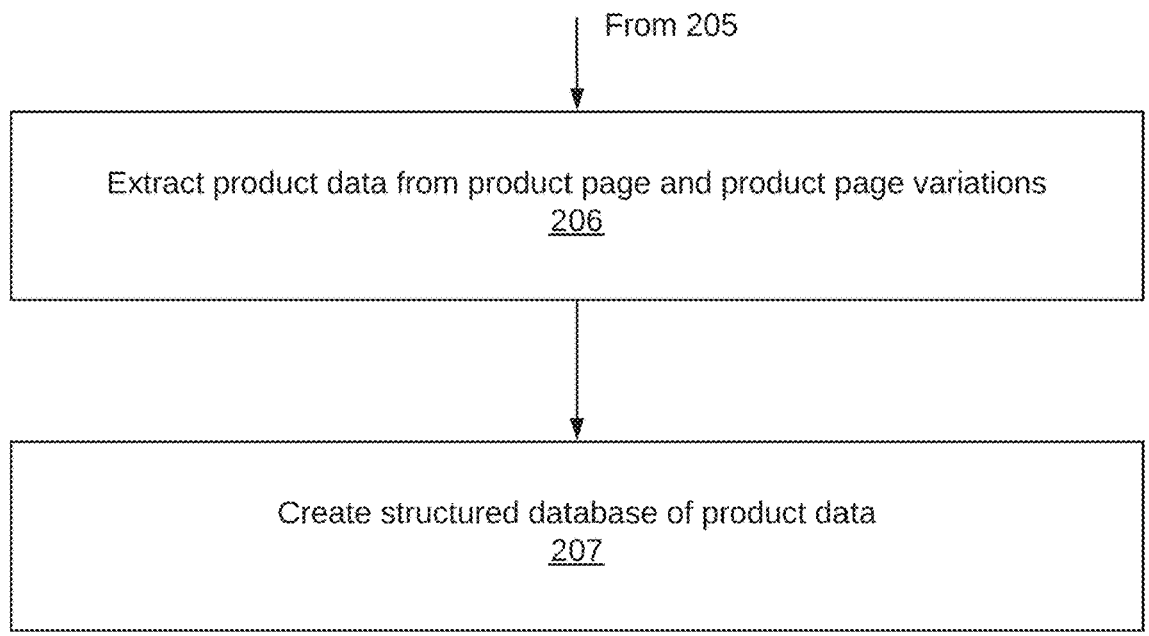

FIGS. 2A-B illustrates an exemplary method 200 for generating a product catalog that may be performed by product catalog generator 110.

In step 201, product catalog generator 110 may identify a set of patterns for location identifiers of product pages 104 on the website 103. These patterns may be used to identified product pages and distinguish them from non-product pages. Patterns may be specified using, for example, regular expressions, computer programming languages, computer grammars, and so on. The patterns may be used to identify certain segments of text and may be referred to as text patterns.

In step 202, the product catalog generator 110 may crawl website 103 to parse the product pages 104.

In step 203, on each product page, the product catalog generator 110 may identify a set of patterns for identifying page data representing product information 203. The patterns may identify product information and distinguish it from non-product information 203. Non-product information may include information that is not about the product, such as, footers, side bars, site menus, disclaimers, and so on. Patterns may be specified using, for example, regular expressions, computer programming languages, computer grammars, and so on. The patterns may be used to identify certain segments of text and may be referred to as text patterns.

In step 204, the product catalog generator 110 may automatically interact with the product pages 104 to generate product page variations. In some websites 103, interactive elements on the page may allow selecting product attributes for different variations, and which may lead to loading a product page variation. The product page variation may comprise a separate web page based on the selection of the variation in the product attribute. The interactive elements may include, for example, menus, drop-down menus, buttons, and other interactive elements.

In step 205, the product catalog generator 110 may identify attribute values from the product page variations. In an embodiment, the attribute values may be identified by computing a set of differences between the product pages and the product page variations. The differences may identify changes in the page content between the product page and a product page variation. These differences may correspond to attribute values that changed in response to interaction with the product page 104.

In step 206, the product catalog generator 110 may extract product data from the product page and product page variations. In some embodiments, the product catalog generator 110 identifies attributes, such as size and color, and attribute values that correspond to values that the attributes may take on, such as size 9.5, 10, 10.5, and colors such as blue, white, and gray. Attributes may be extracted by being matched to master list of attributes that is consistent across multiple websites 103 and attribute values may be normalized to a master list of attributes, similarly to create consistency across multiple websites 103.

In step 207, the product catalog generator 110 may create a structured database of product data. The structured database may take many forms as will be described in more detail herein.

Figure 3:
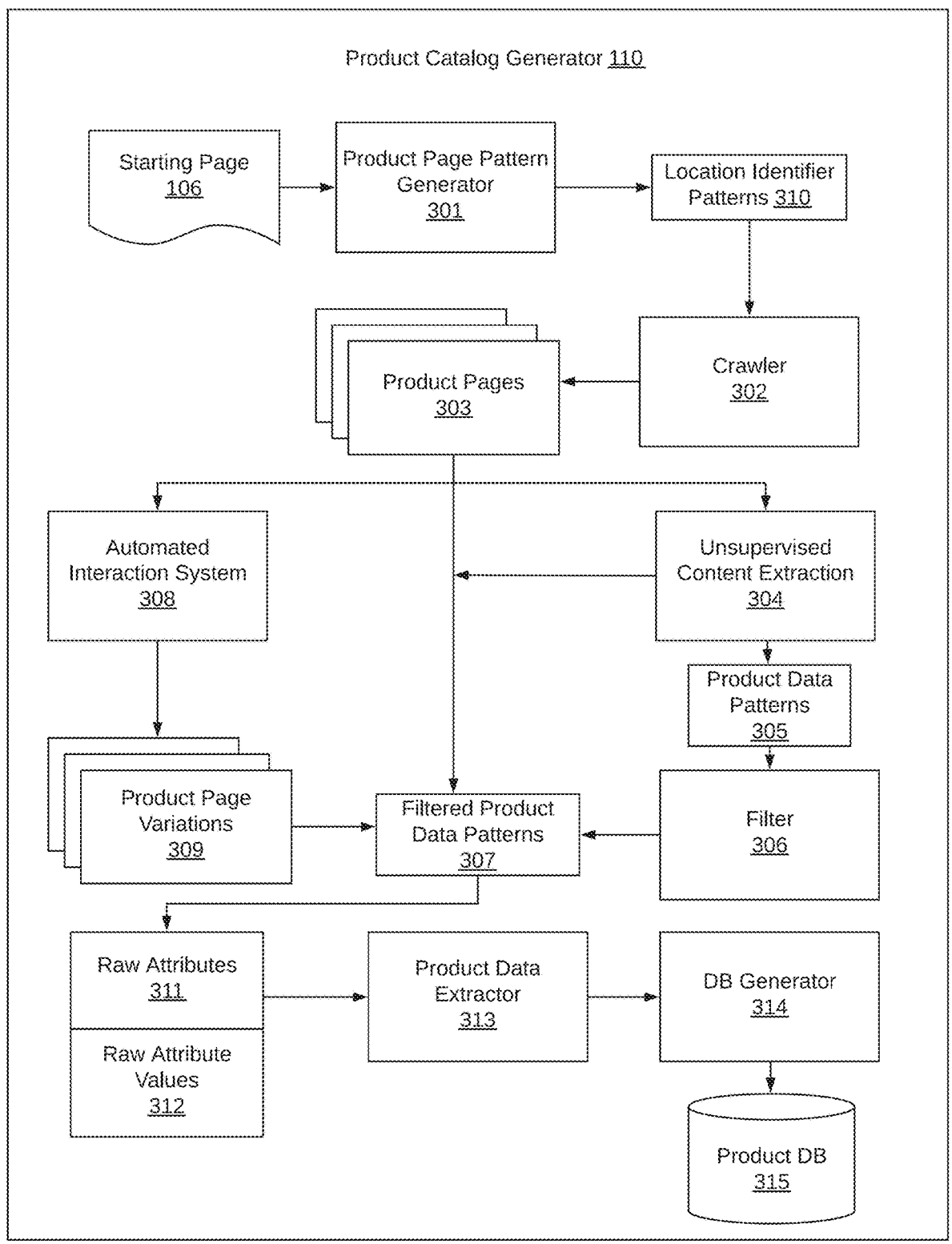
FIG. 3 illustrates exemplary components of product catalog generator in one embodiment.

FIG. 3 illustrates exemplary components of product catalog generator 110 in one embodiment. Components of product catalog generator 110 may include software programs, comprising one or more computer instructions, and data. In an embodiment, the product catalog generator 110 may include starting page 106 of the website 103. For example, starting page 106 may be downloaded from server 102. The starting page 106 may be input to a Product Page Pattern Generator 301 to perform step 201 and generate a set of location identifier patterns 310. The location identifier patterns 310 may identify product pages and non-product pages based on their location identifiers. The location identifier patterns 310 may be input to a web crawler 302. The crawler 302 may perform step 202 and crawl the website 103 to download a set of product pages 303. An Unsupervised Content Extraction (UCE) system 304 may operate on the product pages 303 to perform step 203 and identify a set of product data patterns 305. The product data patterns 305 may comprise patterns for identifying information about a product on a product page. The product data patterns 305 may be input to filter 306, which may filter the product data patterns 305 to narrow down the set of product data patterns 305 through a manual or automated review process to patterns that are the most effective. The filtering process generates filter product data patterns 307. In some embodiments, filtering is not performed and the product data patterns generated by the UCE system 304 are applied directly.

Automated Interaction System 308 may accept as input the product pages 303 and automatically interact with them (step 204) to generate product page variations 309. The product page variations 309 may comprise product pages generated through interaction with interface elements on the product pages 303. Differences may be computed between the product page variations 309 and the product pages 303 to identify attribute values (step 205).

The filtered product data patterns 307 are applied to the product pages 303 and product page variations 309 to extract raw attribute 311 and raw attribute values 312 (step 206). These are input to the product data extractor 313. The product data extractor 313 applies extraction to the raw attributes 311 and normalization to the attribute values 312 to obtain attributes and attribute values. The attributes and attribute values are input to DB Generator 314 to perform step 207 and generate product database 315. A database is any kind of structured data and may comprise any kind of database, including SQL databases, no-SQL databases, relational databases, non-relational databases, flat files, data structures in memory, and other structured collections of data.

Figure 4A:
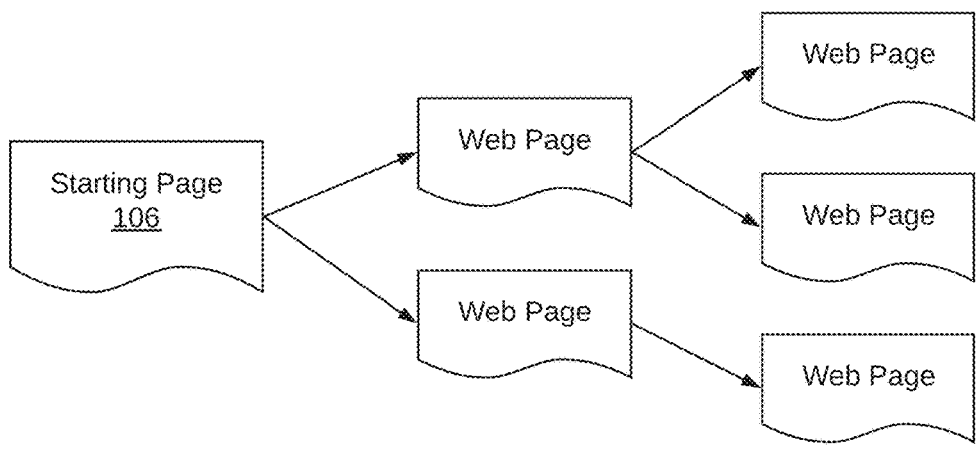
FIG. 4A illustrates an exemplary method for crawling a website.
Figure 4B:
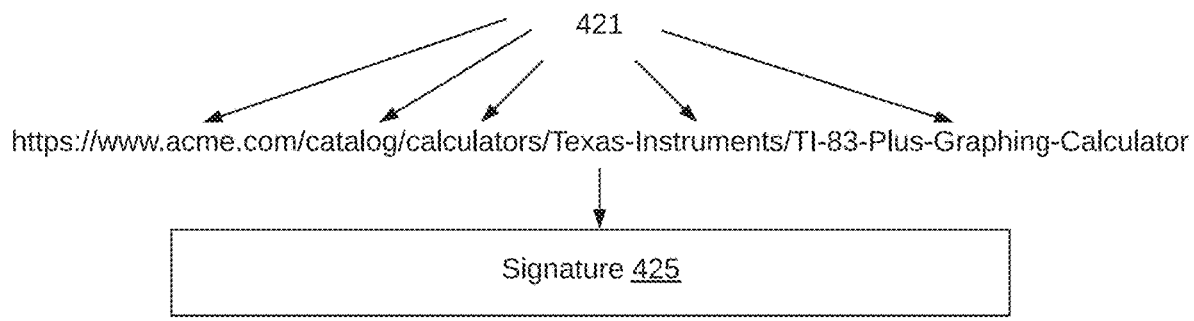
FIG. 4B illustrates an exemplary approach to dividing URLs into constituent parts.
Figure 4C:
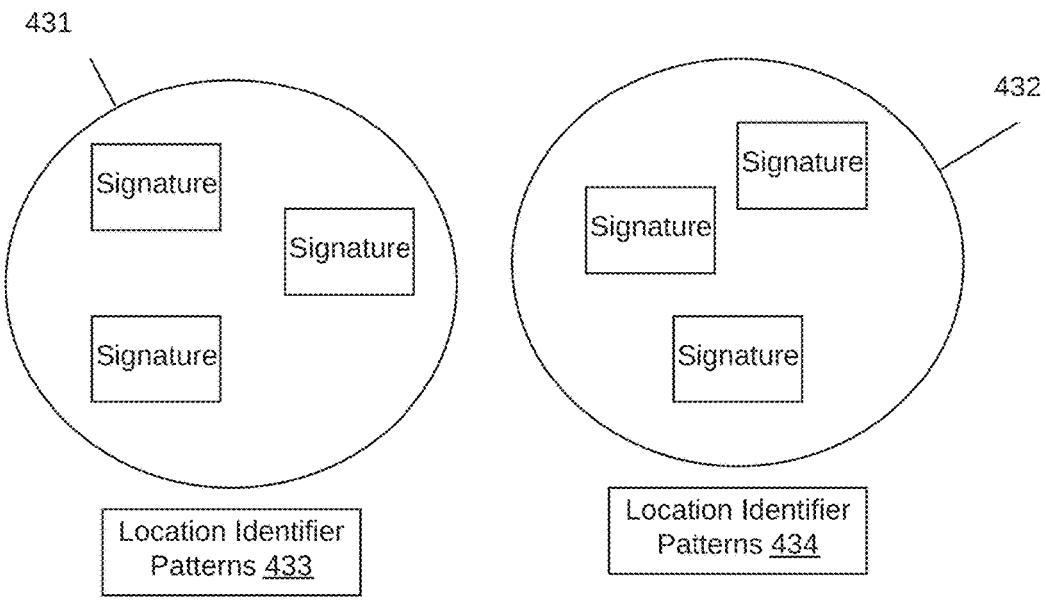
FIG. 4C illustrates clustering that may be performed to group URLs with similar signatures in some embodiments.

FIGS. 4A-C illustrate an exemplary implementation of step 201. As shown in FIG. 4A, in an embodiment, crawling is initiated from the starting page 106. The starting page 106 of website 103 may be chosen arbitrarily. From the starting page 106, crawling may be performed recursively by visiting each web page, extracting the URLs on the web page, and following all or a subset of the URLs on the web page. The process may continue until a stopping condition is reached, which may comprise extracting a threshold number of URLs.

FIG. 4B illustrates an exemplary approach to dividing each of the URLs into constituent parts 421. The division may occur at common delimiters such as forward or backward slashes, question marks, hash signs, and other punctuation marks or characters. Additional information may also be extracted from the URLs such as the domain, subdomain, and host information of the website 103. A signature 425 may be computed for the URL based on the number of constituent elements, the names and order of these elements, and the aforementioned additional information. The signature may be a numerical representation.

As illustrated in FIG. 4C, clustering may be performed to group URLs with similar signatures into clusters 431, 432. Any clustering algorithm may be used to group together numerically similar elements. The clustered elements may then be analyzed to determine common string elements or paths 421. In each cluster 431, 432, the constituents elements 421 of the URLs are analyzed to determine which elements are constant and which are variable. One or more location identifier patterns 433, 434 are generated for each cluster, which match the URLs in the cluster. The location identifier patterns 310 may include wildcards or text patterns for parts of the URLs that are variable, while having constant elements for the parts of the URL that do not change.

Figure 5:
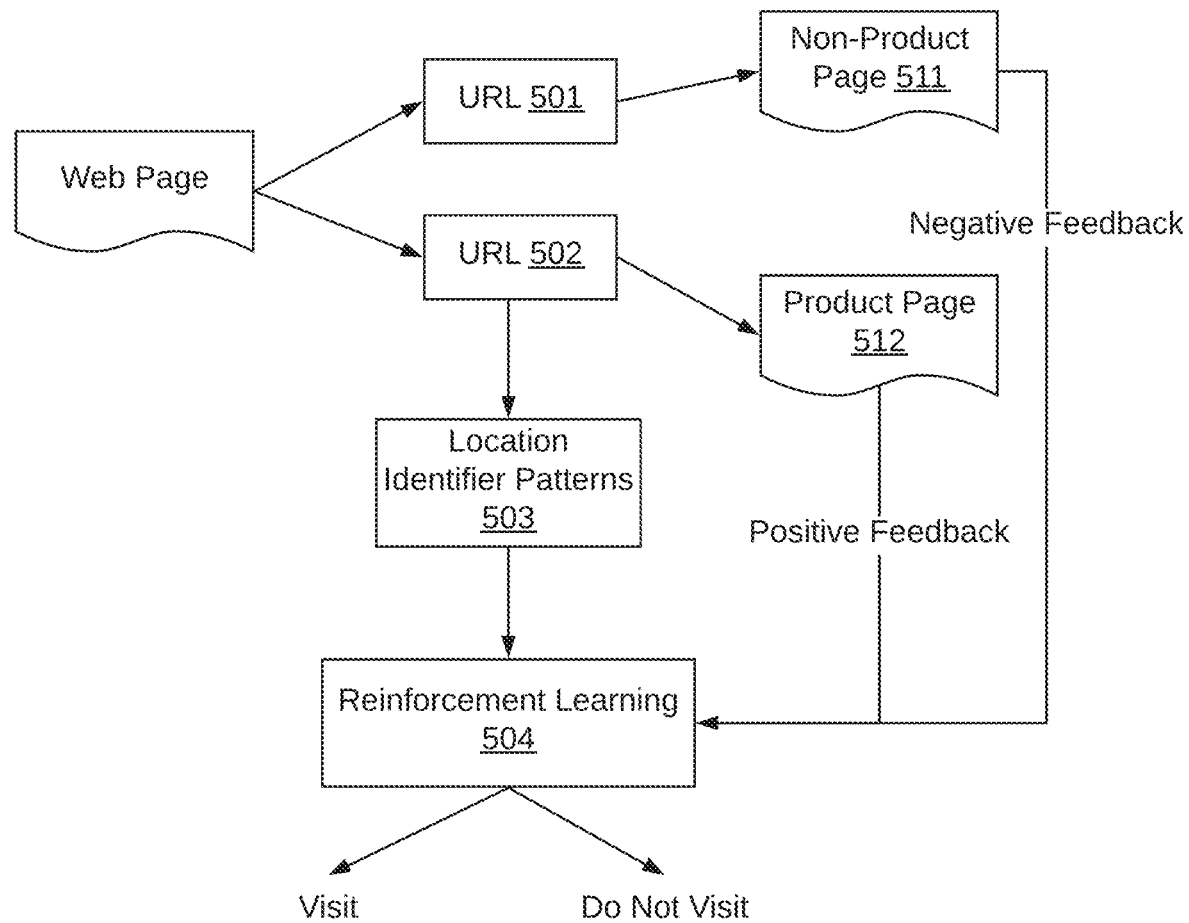
FIG. 5 illustrates an exemplary method of crawling a website to parse product pages.

FIG. 5 illustrates an exemplary implementation of step 202. In an embodiment, web pages of the website 103 are crawled starting from the starting web page 106. The same starting web page or a different starting web page may be used in steps 201 and 202. On each web page, the URLs 501, 502 are extracted from the content of the web page. The location identifier patterns 503 are applied to the URLs to determine if there is match to any of the clusters 431, 432. A reinforcement learning algorithm 504 may be used to determine if a given page URL is followed or not. The reinforcement learning algorithm 504 may learn to associate some of the clusters with product pages and other of the clusters with non-product pages. Reinforcement learning algorithm 504 may comprise an AI or machine learning system. If the URL matches a cluster that is associated with product pages, then the reinforcement learning system 504 causes the crawler 202 to visit the page. When a web page is visited, filtered product data patterns 307 are run on the page to determine that the web page is a product page and to extract data from it. If the page is not a product data page (i.e., a non-product data page 511), then negative feedback is input to the reinforcement learning system 504 to make it less likely to visit URLs matching the associated location identifier pattern in the future. The reinforcement learning system 504 may learn to associate certain location identifier patterns with non-product pages based on the feedback. When a product page 512 is visited, then positive feedback may be input to the reinforcement learning system to cause it to visit web pages matching the associated location identifier pattern more often. In some embodiments, the product pages are stored and tracked, and when a product page is visited again then negative feedback is provided instead of positive feedback to reduce duplication. The positive and negative feedback may be provided in the form of positive and negative scores in a reward system.

FIGS. 6A-G illustrate an exemplary implementation of step 203. Processes may be performed by UCE system 304 to identify product data patterns 305 that identify product data in the content of the web page.

Figure 6A:
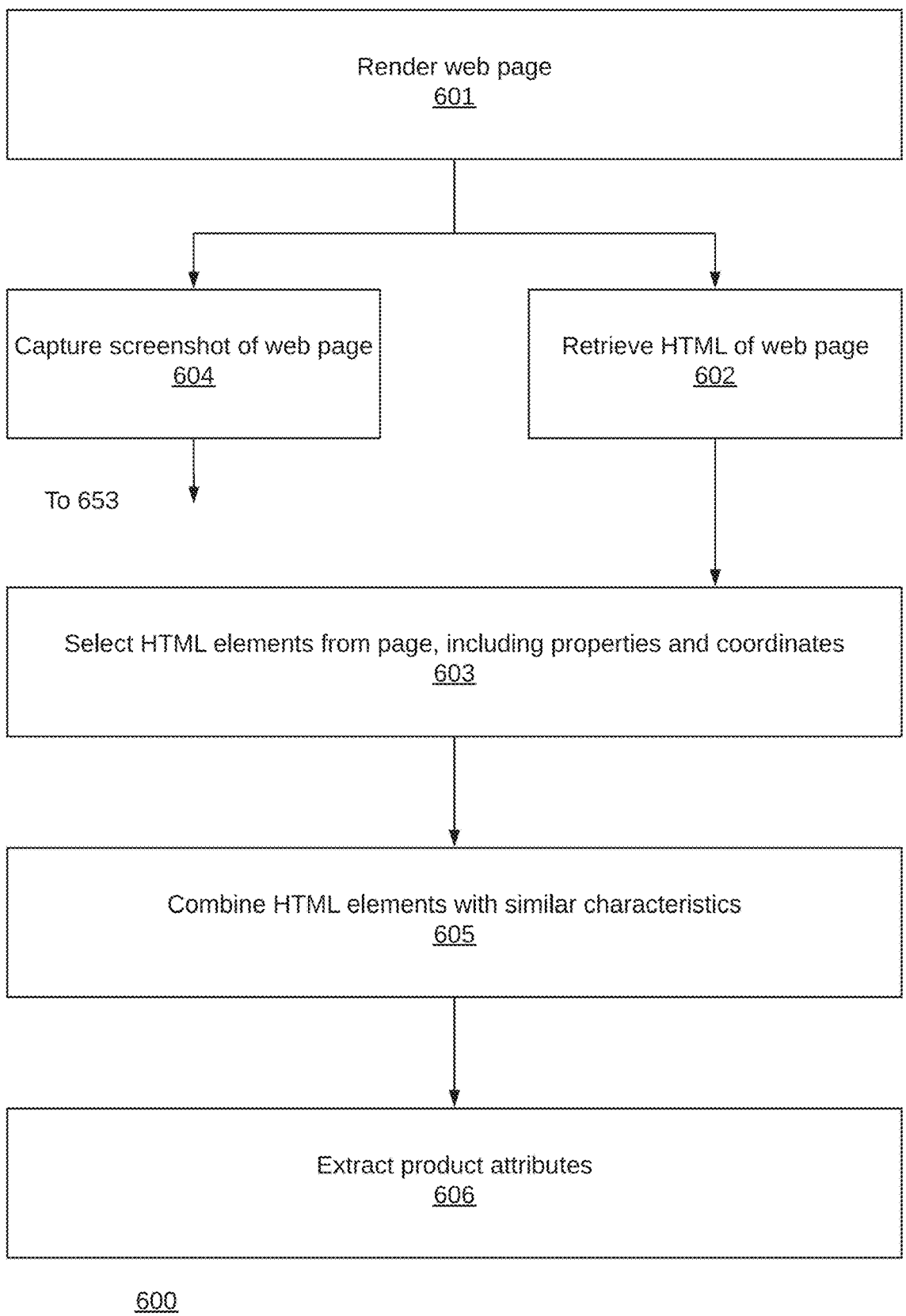
FIG. 6A illustrates an exemplary method that may be performed on a product page.

FIG. 6A illustrates an exemplary method 600 that may be performed on a product page, after the web page has been determined to be a product page. In step 601, the UCE system 304 may render the web page. For example, the web page may be rendered in a headless web browser. In step 602, the HTML code on the web page may be retrieved, such as in text form. In step 603, hypertext markup language (HTML) elements are selected from the web page, including a plurality of properties of the HTML elements and their coordinates on the web page. In step 604, a screenshot of the web page may be taken. In some embodiments, step 604 may occur in parallel to step 602. Additional processing of the screenshot is described in FIG. 6F. In step 605, HTML elements with similar characteristics may be combined. For example, portions of a product description may appear in multiple HTML elements and may be combined by the system into a single product description field. In step 606, product attributes may be extracted from the web page. In some embodiments, the product attributes are extracted as product data patterns 305 that may be applied to the product page to identify product information on the web page.

Figure 6B:
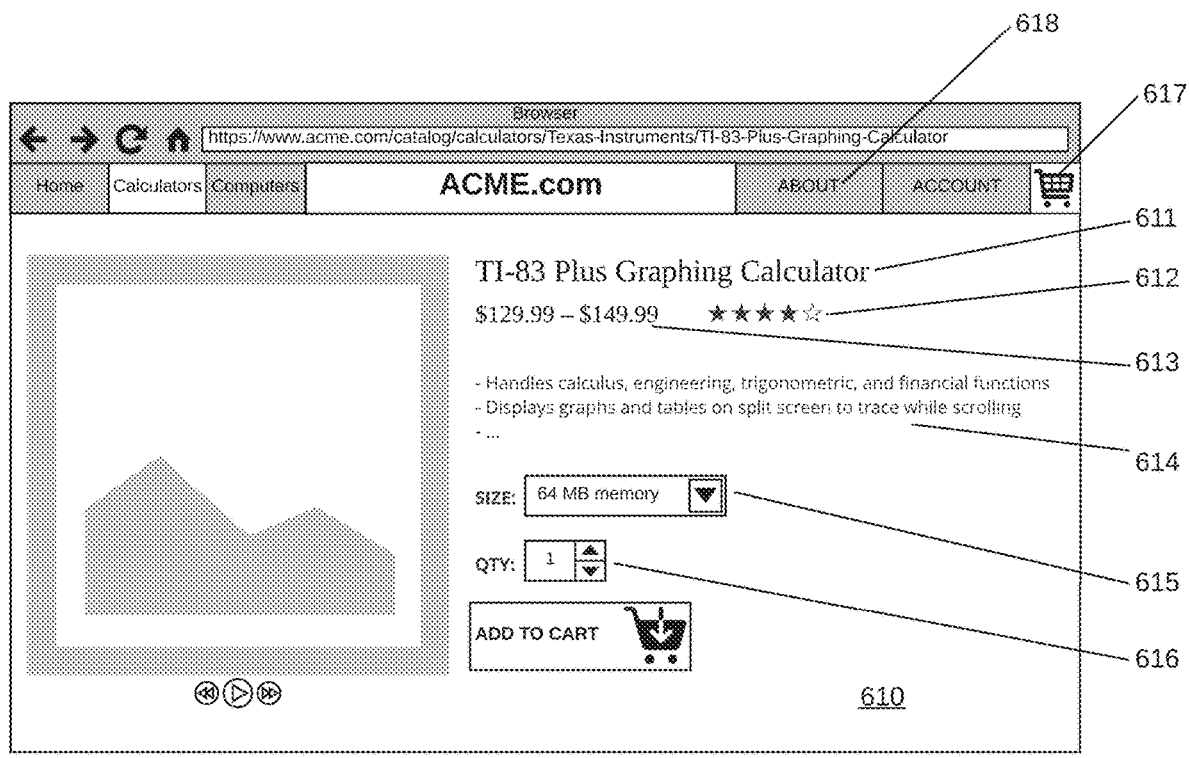
FIG. 6B illustrates exemplary HTML elements selected from a web page.

FIG. 6B illustrates HTML elements selected from a web page 610. The HTML elements may include a product title 611, product rating 612, price 613, product description 614, size 615, quantity 616, shopping cart button 617, and about button 618. The HTML elements may be identified automatically by analyzing text patterns, though the identity of what the HTML elements correspond to may not be known until after method 600 is performed. For each element, CSS properties may be identified based on the web page 610 source code. CSS properties may include font-size, font-weight, position, relative size, and so on. Other properties may also be computed, such as the number of words, number of sentences, and so on. Some features may be computed relative to other elements on the page, such as distance from other elements.

Method 600 for identifying product attributes in a page may be implemented in a plurality of ways. Four embodiments will be described herein, including machine learning, identification of meta tags, applying known patterns in a Document Object Model (DOM) structure, and image segmentation.

Figure 6C:
FIG. 6C illustrates an exemplary method for using a machine learning model to identify product attributes on a product page.
Figure 6C:

FIG. 6C illustrates an exemplary method 620 for using a machine learning model to identify product attributes on a product page. In step 621, a machine learning model is trained to identify product attribute based on features of HTML elements. The features of the HTML elements may comprise any of the properties and aspects described herein, such as CSS properties, computed properties, and coordinates. The machine learning model may be trained with training examples comprising feature sets of HTML elements and their corresponding output labels identifying what product attribute they correspond to, or whether they do not correspond to a product attribute. By training on the training examples, the internal parameters of the machine learning model may be adjusted to learn a model for classifying HTML elements to product attributes based on their features.

In step 622, HTML elements may be selected from the web page, including their various properties and coordinates. In step 623, the machine learning model may be applied to the HTML elements to predict whether they correspond to a product attribute, and which product attribute they correspond to, if so.

In some embodiments, a single machine learning model may be used to classify each of the HTML elements to product attributes. In other embodiments, separate machine learning models may be used for individual product attributes. For example, one machine learning model may be used for detecting the size attribute and another may be used for detecting the color attribute.

Figure 6D:
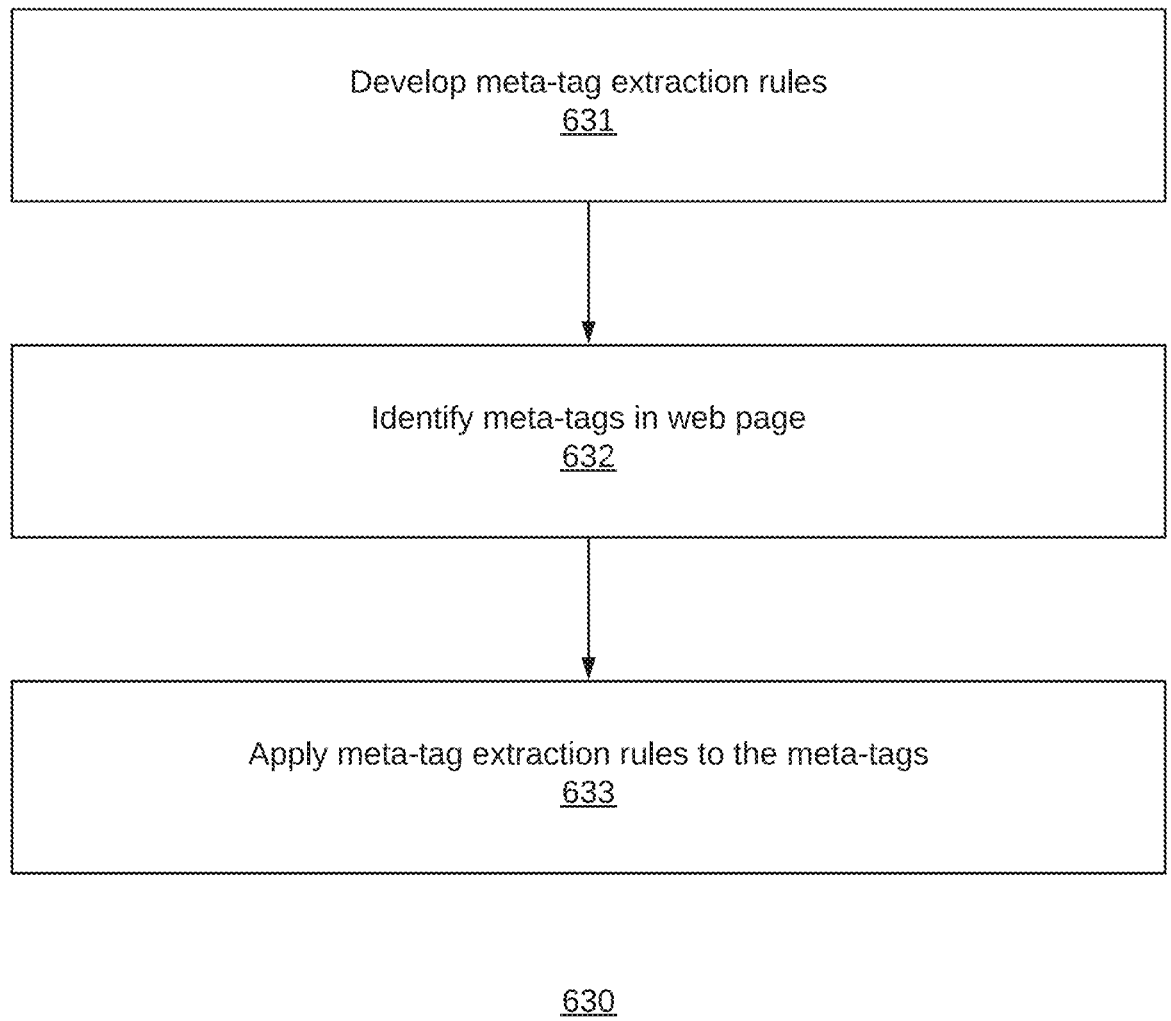
FIG. 6D illustrates an exemplary method for extracting product attributes using meta-tags.

FIG. 6D illustrates method 630 for extracting product attributes using meta-tags. HTML web pages may include meta-tags, which specifically identify certain attributes. Various meta-tag conventions exist. For example, in the Open Graph Protocol, meta-tags are identified with og:attribute. Thus, the product title may be extracted from <meta property="og:title" content="iPhone 8 64 GB"/>. Similarly, Schema Markup Tags use the form itemprop="attribute" to identify attributes, such as itemprop="price" for the product price. In other embodiments, in JSON LD, product attributes may be encoded in JSON and may be parsed using a JSON parser.

In step 631, meta-tag extraction rules are developed. In step 632, meta-tags are identified in a web page by parsing the web page. In step 633, the meta-tag extraction rules are applied to the meta-tags to extract the associated values.

Figure 6E:
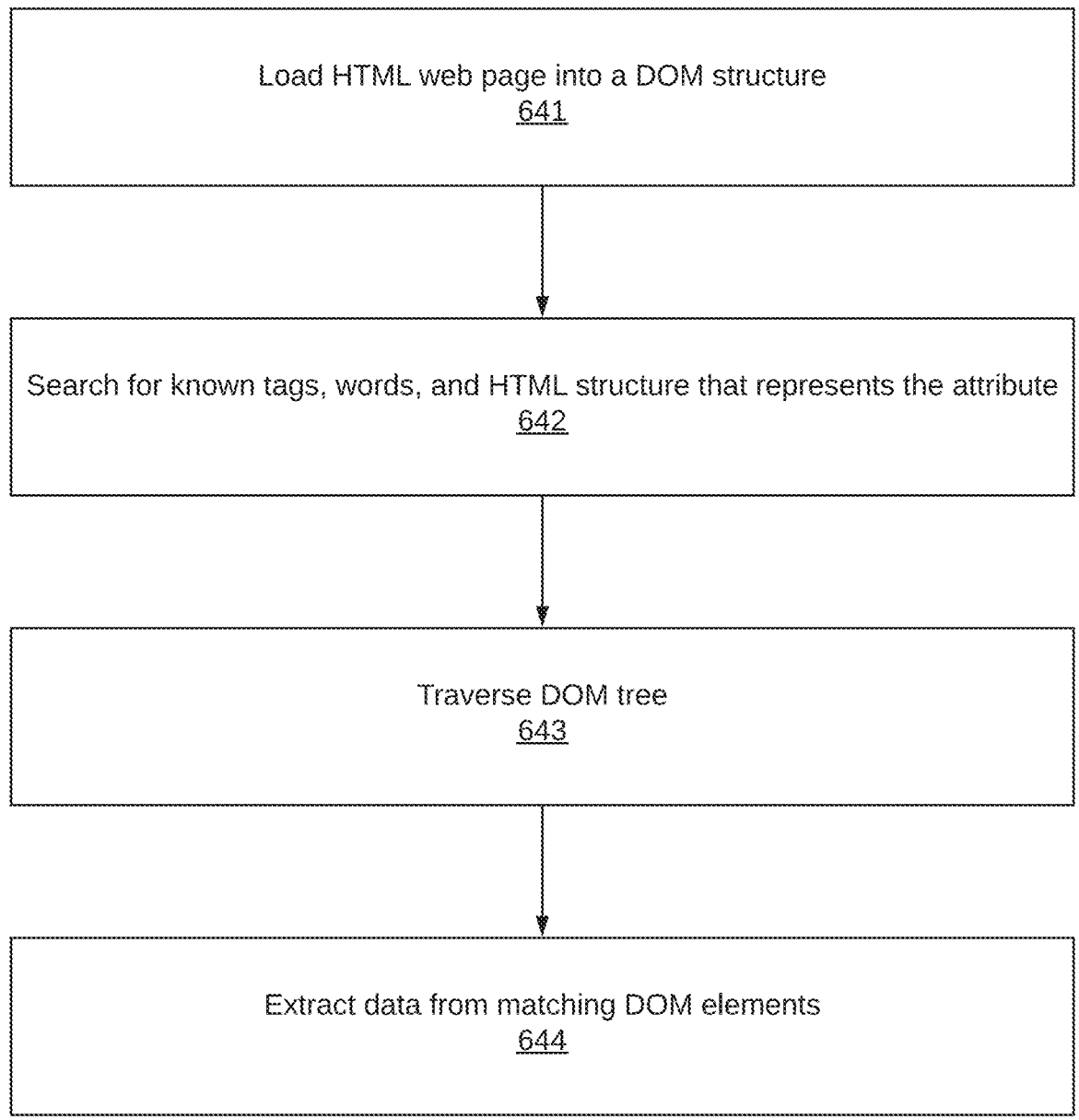
FIG. 6E illustrates an exemplary method for extracting product attributes using a DOM structure.

FIG. 6E illustrates an exemplary method 640 for extracting product attributes using a DOM structure. A DOM structure is a structured tree representation of a web page. In step 641, a product page may be loaded from its HTML into a DOM structure. In step 642, each DOM element may be searched for known tags, words, and HTML structures that represent a product attribute. The search may be heuristic and based on known tags, words, and HTML structures that are typically associated with a particular attribute. In step 643, the DOM tree may be traversed and the processed applied to each DOM element. In step 644, data may be extracted from matching DOM elements.

Figure 6F:
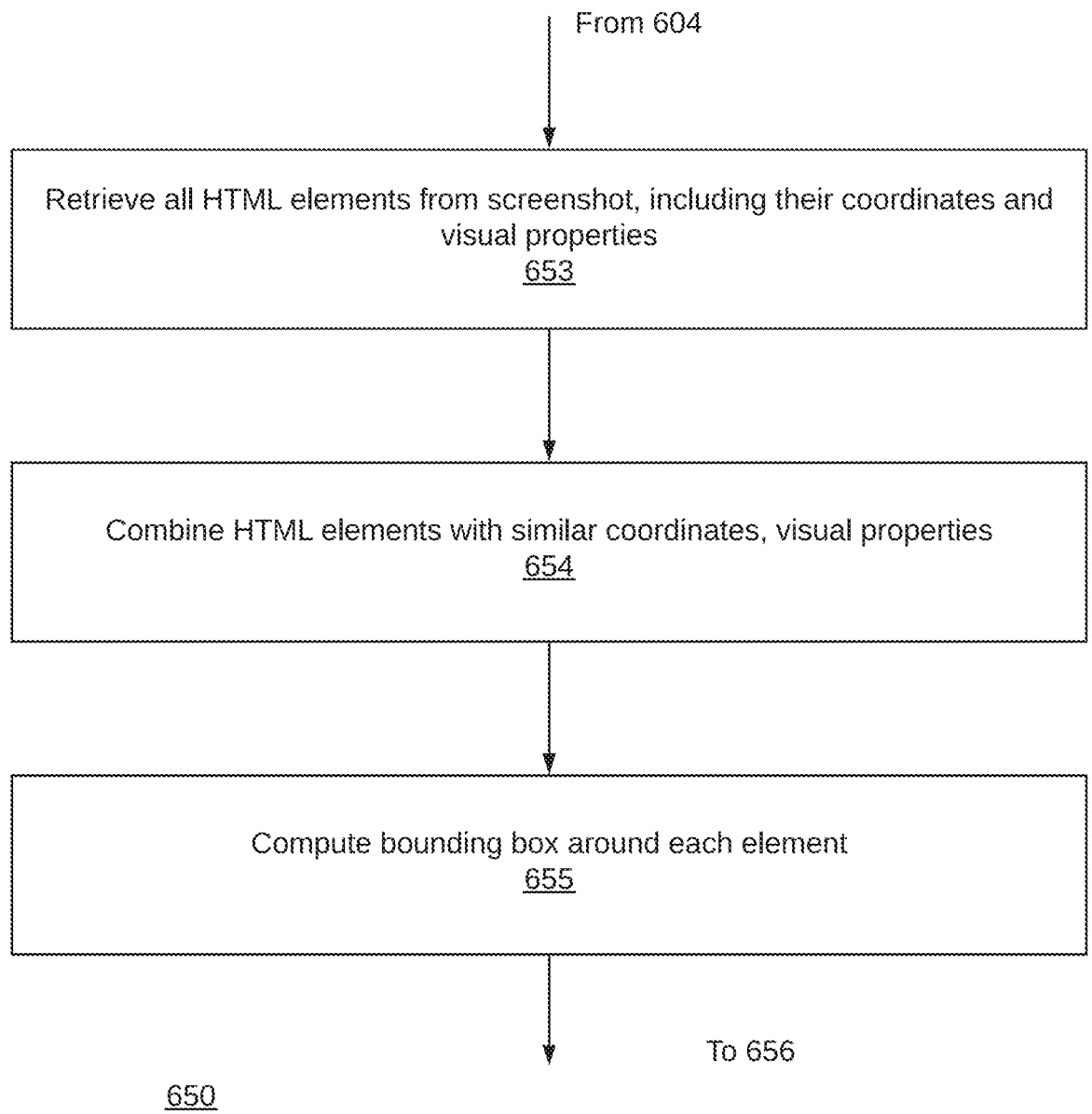
FIGS. 6F-G illustrate an exemplary method for extracting product attributes using computer vision.
Figure 6G:
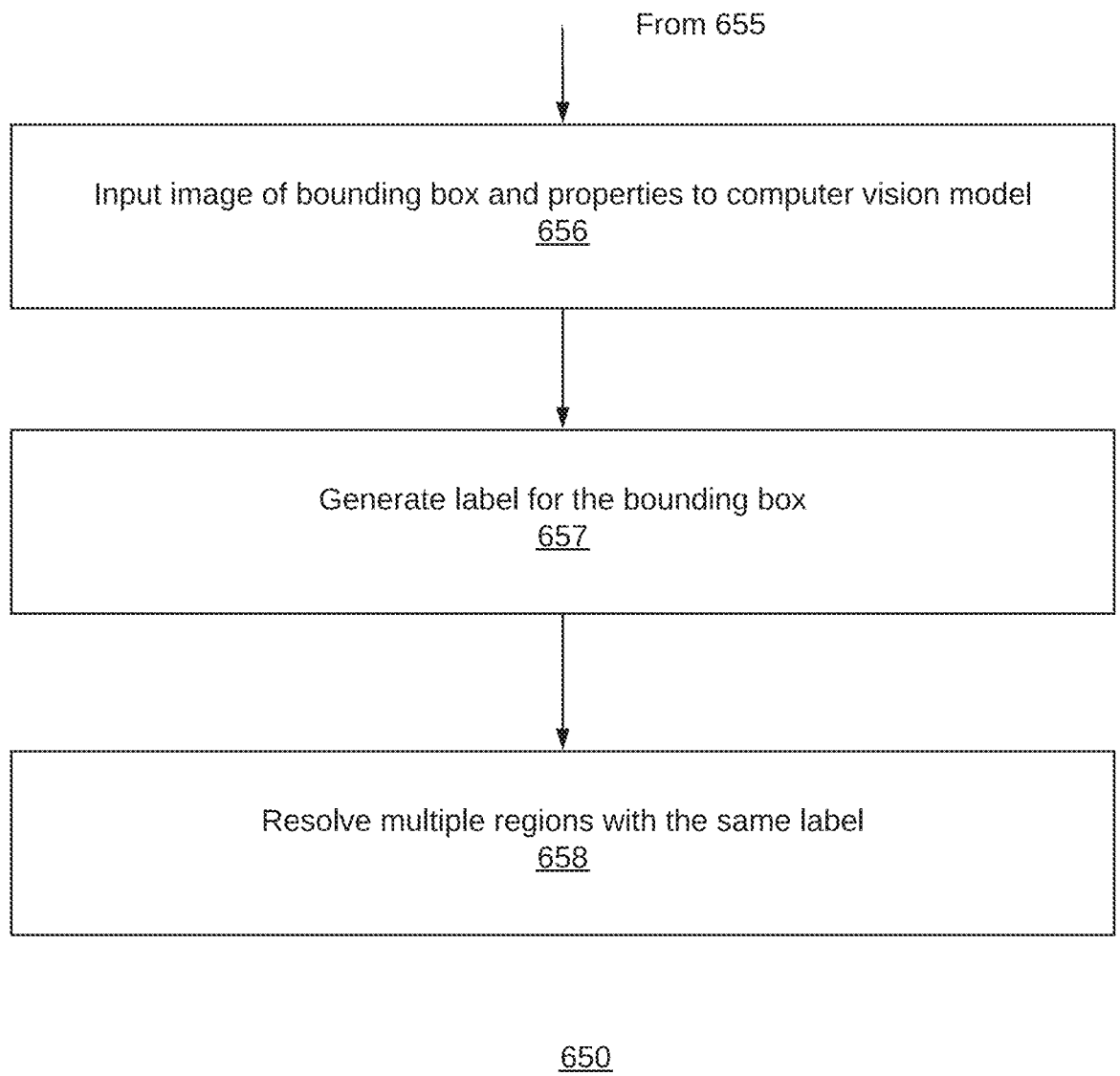

FIGS. 6F-G illustrate an exemplary method 650 for extracting product attributes using computer vision, and which may comprise a continuation of method 600 for extracting product attributes. As described above, in step 604, a screenshot is captured of the website. In step 653, all the HTML elements of the web page are retrieved from the screenshot. The HTML elements may include the visual representation of the HTML elements, such as an image of the HTML elements extracted from the screenshot. Moreover, the HTML elements, may include their visual properties, such as color and height, and coordinates on the web page. In step 654, HTML elements with similar characteristics may be combined. For example, HTML elements with adjacent or overlapping coordinates may be combined. In step 655, a bounding box is computed around each of the HTML elements. The bounding boxes may comprise coordinates, such as a left and right X value and top and bottom Y value. The bounding boxes may be derived based on the HTML code of the HTML elements. In step 656, an image may be captured of the contents of each bounding box and these images may be input to a computer vision model. In step 657, the computer vision may predict a label for each image to identify each as a product attribute or not. If the image corresponds to a product attribute, the computer vision model may predict which product attribute it corresponds to. In step 658, if multiple images correspond to the same product attribute, then these conflicts may be resolved. For example, the computer vision model may output associated confidence values, and the label with the highest confidence value may be applied.

After UCE system 304 has generated the product data patterns 305, additional filtering 306 may be applied to further refine the automatically generated product data patterns 305. The filtering process may generate filtered product data patterns 307.

FIGS. 7A-E illustrate an exemplary implementation of steps 204-205. Product catalog generator 110 may perform automated interactions with product pages 303 to generate product page variations. The initially generated product pages 303 may be referred to as base product pages to distinguish them from the product page variations 309.

Figure 7A:
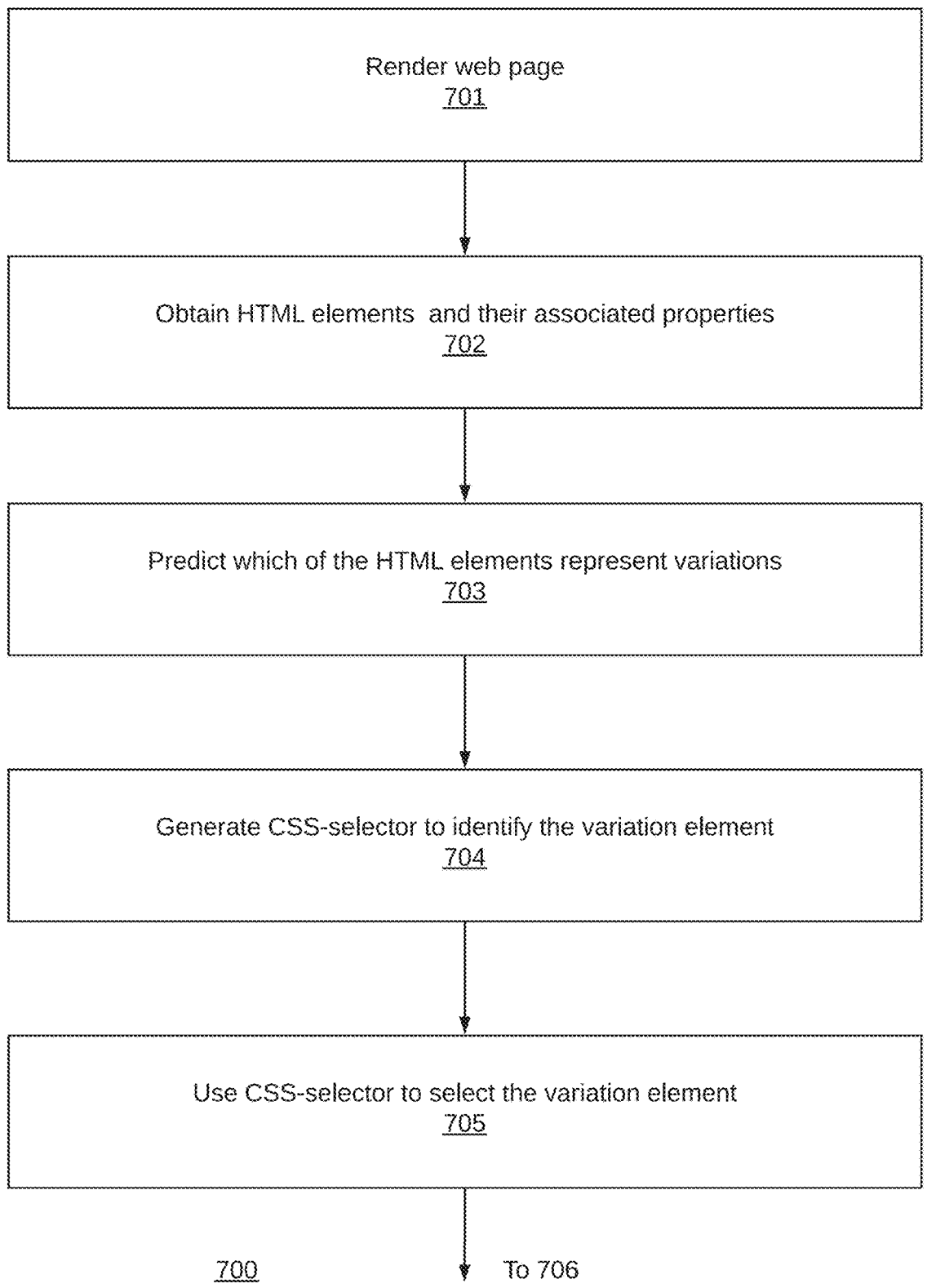
FIGS. 7A-B illustrate an exemplary method that may be used to perform interactions on a product page and generate product page variations.
Figure 7B:
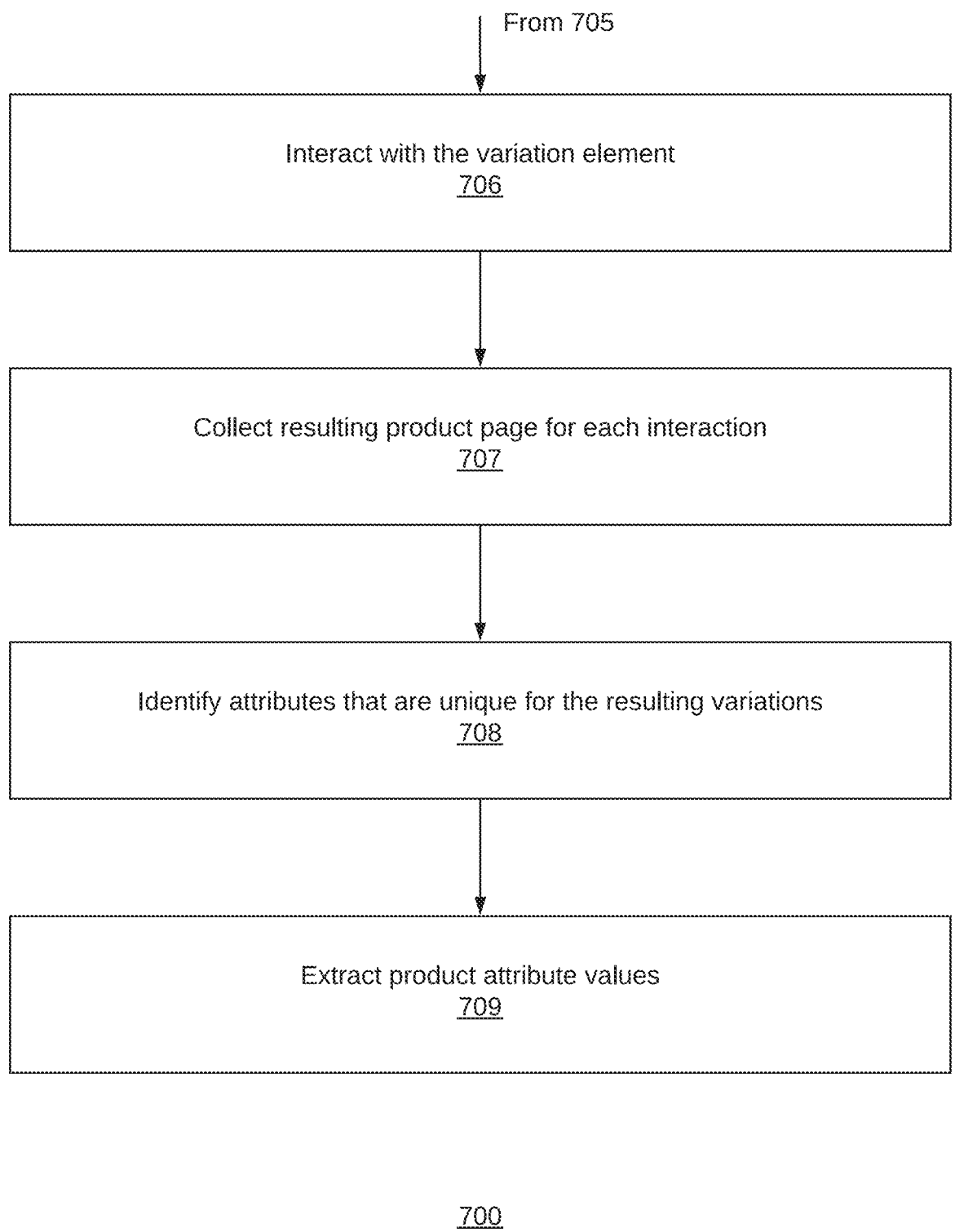

FIGS. 7A-B illustrate an exemplary method 700 that may be used to perform interactions on a product page and generate product page variations 309.

In step 701, a web page may be rendered in a headless browser. In step 702, the HTML elements of the web page and their associated properties may be obtained. The properties may include, for example, CSS properties, computed properties, and coordinates. In step 703, the program may predict which of the HTML elements represent interface elements corresponding to a variation (variation elements). In step 704, a CSS-selector may be generated to identify the aforementioned variation elements. In step 705, the CSS-selector may be used to select the variation element. In step 706, the variation element may be interacted with automatically from a headless browser emulating human interaction with the element. The automatic interaction may be performed systematically to iterate through each option available for the variation element. Moreover, each variation element may be systematically activated so that all variations of all variation elements are tried. In step 707, the resulting product pages for each of the interactions may be collected. In step 708, the automated interaction system 308 may identify attributes that are unique for the product page variations. The unique attributes may be identified by computing differences between the base product pages and the product page variations. This may be referred to as computing a diff. The differences identify the unique data that exists only on the product page variation. The unique attributes identified in this way may correspond to attribute values. For example, by activating a size button on a product page for size 9.5, a new product page variation may be generated that may be identical to the base product page except that it identifies the size is 9.5. By computing differences, the value 9.5 may be identified as a difference in the page. In step 709, the product attribute values may be extracted by obtaining the differences between the pages.

Figure 7C:
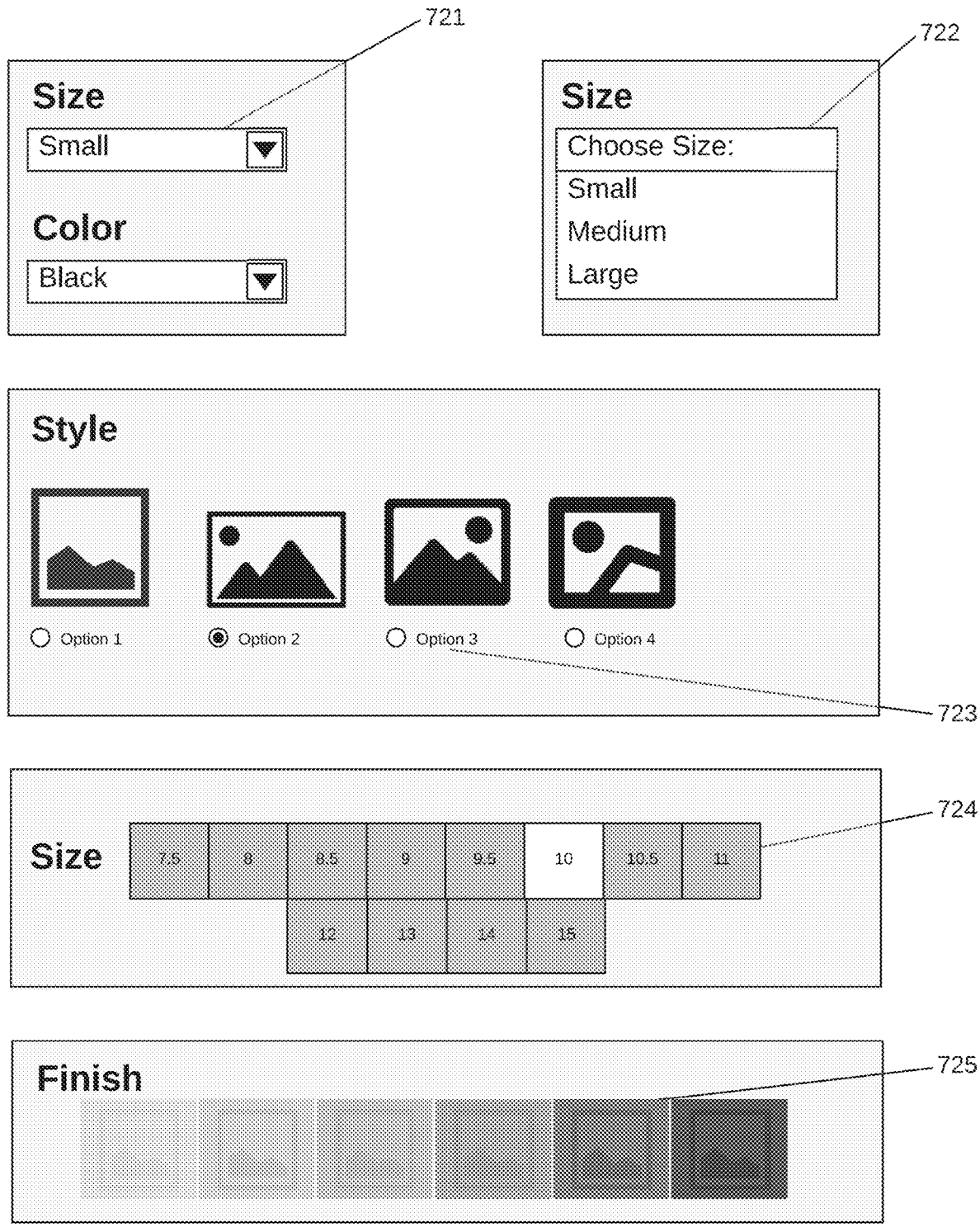
FIG. 7C illustrates a variety of exemplary interaction elements that may be used in an automated interaction system.

FIG. 7C illustrates a variety of interaction elements that may be used in the automated interaction system 308. A wide variety of button, menu elements, and other interface elements may be interacted with by the automated interaction system 308. For example, drop-down menus 721 and 722 may be interacted with. Menu 721 is created with an HTML drop-down menu element and menu 722 is styled to act like a drop-down menus using other HTML components. Radio buttons 723, buttons 724, and image buttons 725 may all be interacted with.

Figure 7D:
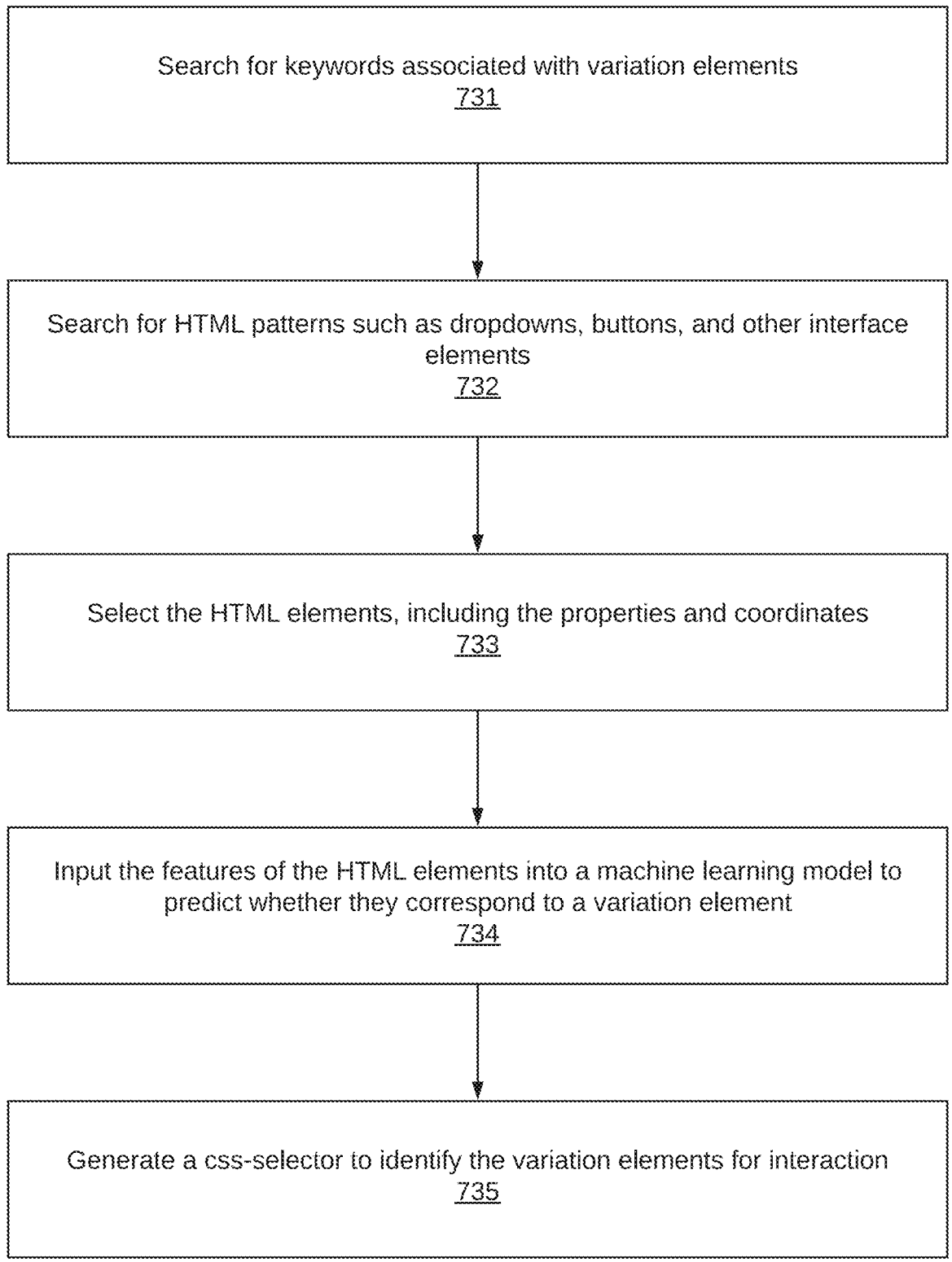
FIG. 7D illustrates one exemplary method for identifying variation elements on a web page.

FIG. 7D illustrates one exemplary method 730 for identifying variation elements on a web page. In step 731, the automated interaction system 308 searches for keywords associated with variation elements. For example, keywords signifying a product attribute, such as size or color, may be associated with variation elements as a label. HTML elements associated with the keywords are identified. In step 732, the automated interaction system 308 searches for HTML patterns such as dropdowns, buttons, and other interface elements that are associated with variation elements. In step 733, the HTML elements identified via keywords in step 731 or HTML patterns in step 732 are selected along with their properties and coordinates. These properties are, for example, CSS properties, computed properties, or coordinates as described in FIG. 6B, for example. In step 734, the features of the HTML elements are input into a machine learning model to predict if the HTML element corresponds to a variation element, and, if so, what kind of variation element. The machine learning model may be trained based on training examples of HTML features and corresponding output labels identifying whether the HTML element is a variation element and the type of variation element. In step 735, once the HTML elements corresponding to the variation elements are identified, a CSS-selector is generated to identify the variation elements for interaction. The CSS-selector may be used to select all of the variation elements so that they may be interacted with by the automated interaction system 308.

Figure 7E:
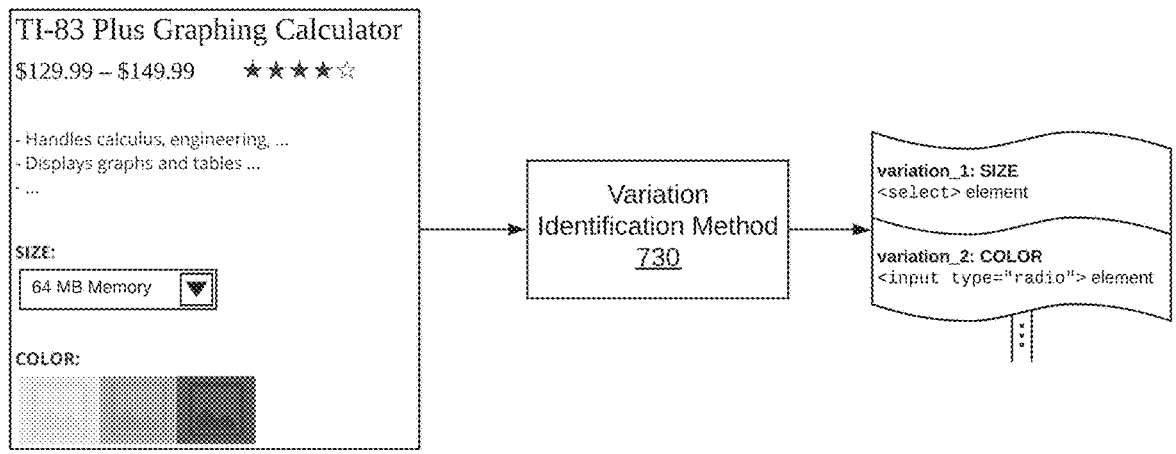
FIG. 7E illustrates the use of a selector to select variation elements for generating product page variations in some embodiments.

FIG. 7E illustrates the use of a selector to select variation elements for generating product page variations 309. As shown, a raw HTML web page and variation text is illustrated. This is passed into variation identification method 730, which identifies the variation elements in the page. The variation identification method may find a common patterns for identifying HTML elements using a selector and generate the appropriate selector for the variation elements. The selector is generic enough to capture all forms of the variation element on the page, without capturing non-variation elements. By applying the selectors, variation elements are identified, such as a variation element for selecting size and another variation element for selecting color.

Figure 7F:
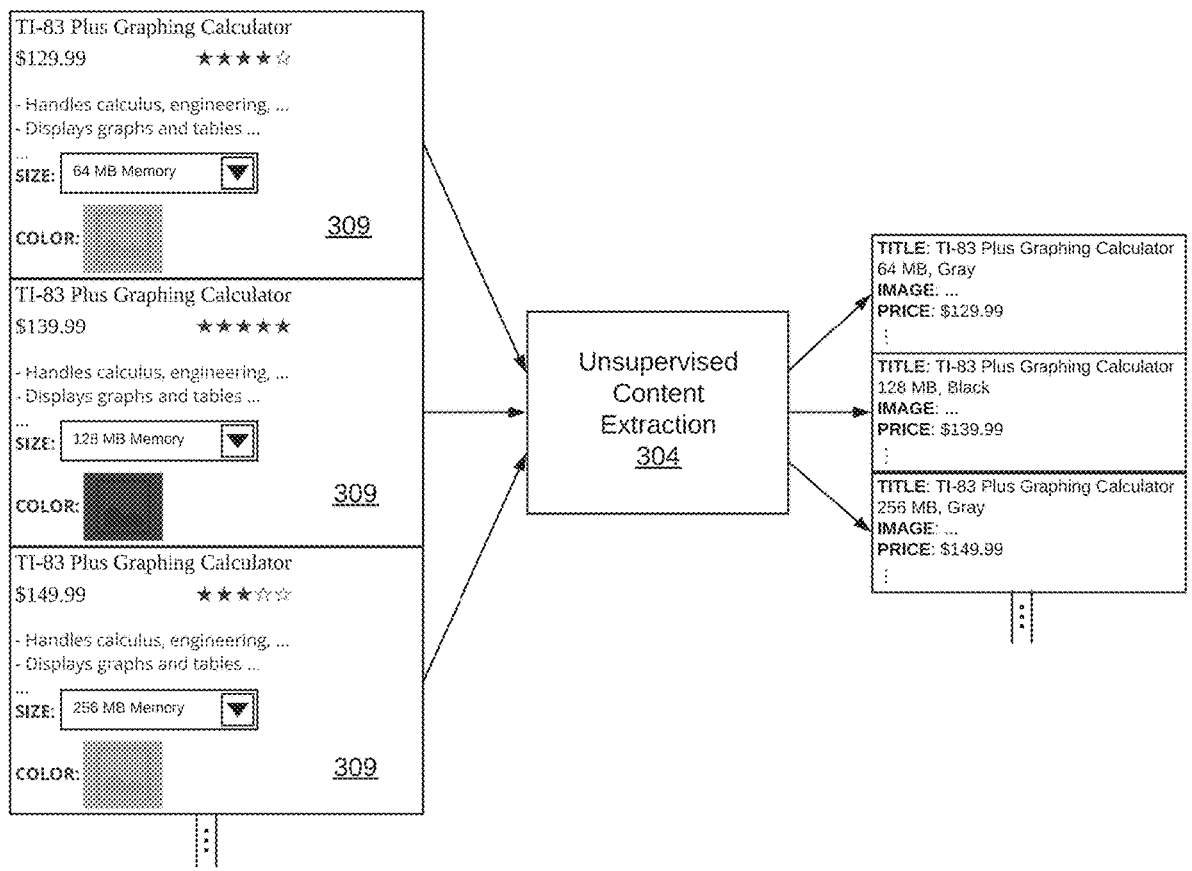
FIG. 7F illustrates an exemplary process by which a UCE system is applied to a plurality of the product page variations to automatically extract the attributes and attribute values from product page variations.

FIG. 7F illustrates a process by which the UCE system 304 is applied to each of the product page variations 309 to automatically extract the attributes and attribute values from the product page variations 309. As illustrated, the UCE system 304 extracts attributes such as title, image, and price and the correct values of each value from a plurality of product page variations.

Figure 8A:
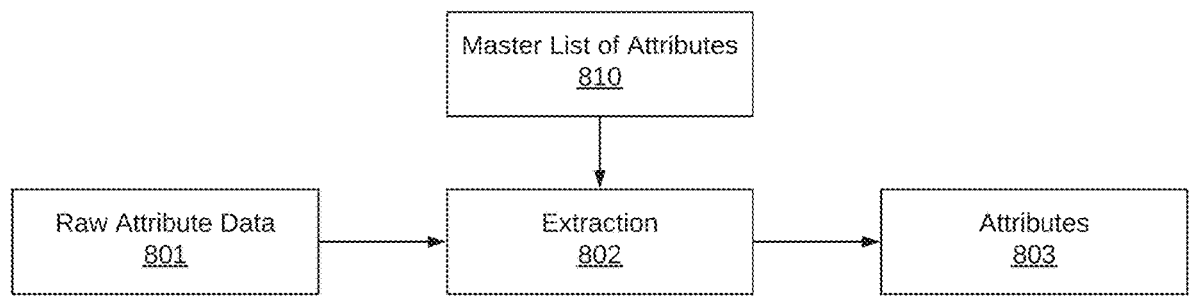
FIG. 8A illustrates a process by which raw attribute data from product pages may be standardized.
Figure 8B:
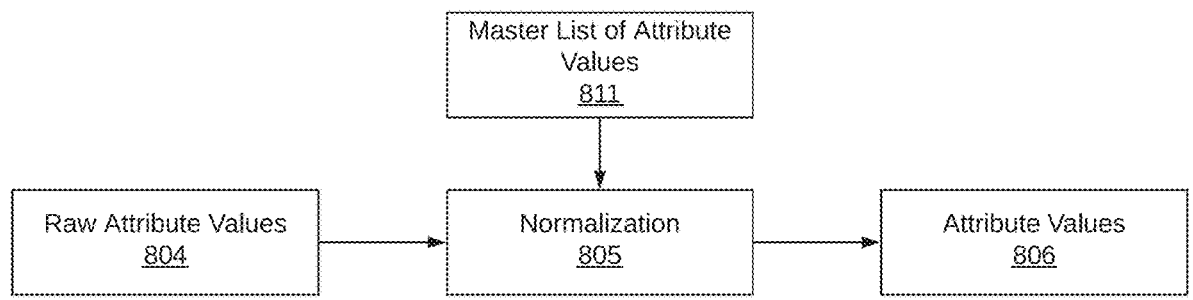
FIG. 8B illustrates a process by which raw attribute values from product page variations may be standardized.

FIGS. 8A-B illustrate an exemplary implementation of step 206. The product catalog generator 110 may be used to generate a product catalog of information across multiple web sites. Websites in different domains may refer to product attributes and product values using different names and, for the product catalog to be useful, it may be desirable to standardize them. For example, product attributes such as price and cost or weight and product weight may be standardized to the same value. Similarly, product attribute values such as gray and grey may be standardized to the same value. Product attribute values may also be standardized across different measurement systems such as translating between the metric system and the U.S. measurement system.

FIG. 8A illustrates a process by which raw attribute data from product pages 303 may be standardized. A master list of attributes 810 may be stored and accessed. The master list of attributes 810 may comprise all the attributes in the product catalog. In some embodiments, the master list of attributes 810 may also comprise a mapping from non-standardized attributes (e.g., product weight) to the standardized attributes (e.g., weight). The raw attribute data 801 may undergo an extraction process 802 where the master list of attributes 810 is accessed to identify the corresponding standardized attribute. The resulting attributes 803 may be output.

FIG. 8B illustrates a process by which raw attribute values 804 from product page variations 309 may be standardized. A master list of attribute values 811 may be stored and accessed. The master list of attribute values 811 may comprise all the valid attribute values. For fields with numerical ranges, like weights, the master of list of attribute values 811 might not enumerate all the possible values but instead identify the standardized units for the value so that product page variations listing other units may be standardized. In some embodiments, the master list of attribute values 811 may comprise a mapping from non-standardized attributes (e.g., grey) to the standard attribute values (e.g., gray). The raw attribute values 804 may undergo a normalization process 805 where the master list of attribute values 811 is accessed to identify the corresponding standardized attributed values. The resulting attribute values 806 may be output.

Figure 9:
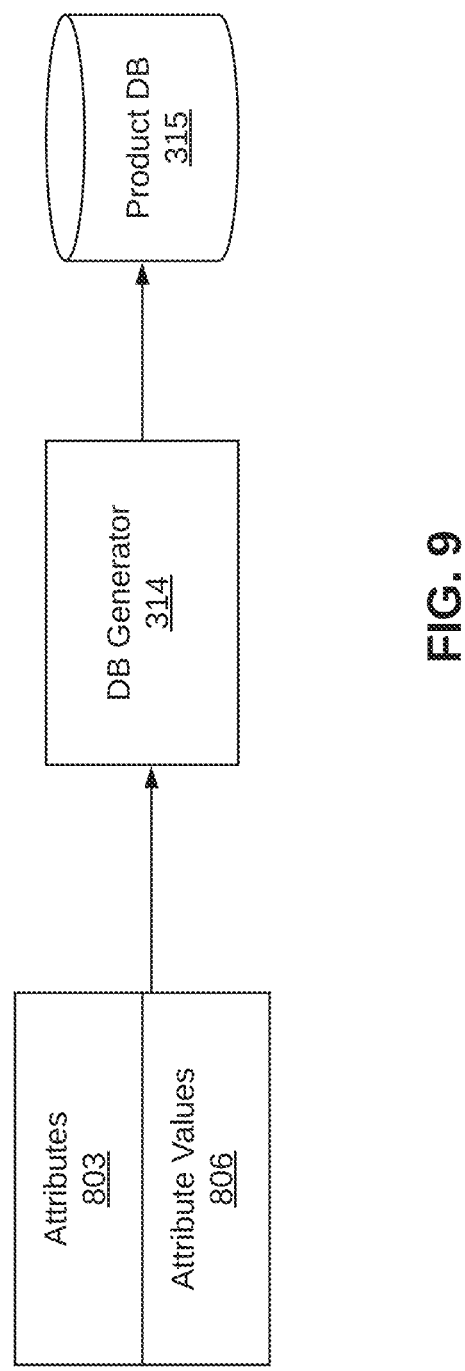
FIG. 9 illustrates an exemplary method of creating structured product data.

FIG. 9 illustrates an exemplary implementation of step 207. Attributes 803 and attribute values 806 may be input to a database generator 314 to generate product database 315.

In one embodiment, product database 315 comprises a graph database where the nodes correspond to products and the edges correspond to attributes and values. For example, all nodes where the brand attribute is equal to Apple may be connected by an edge. The use of edges corresponding attributes and values allows easy filtering of products based on attribute values.

In one embodiment, product database 315 comprises a full-document store or free-text database. The product database 315 may store the full text identifying the products, attributes, and available attribute values. For example, a database entry for a product may include information about all the attributes and all the potential values of those attributes. This enables a user to quickly review all the possible variations of a product. The product database 315 may include one or more indices allowing for quick search and retrieval.

In one embodiment, product database 315 includes with one or more of the product entries a product embedding. The product embedding may comprise a vector representing the product. The vectors may be generated with a machine learning model that accepts product features, such as attributes and attribute values, as input and output the product embedding. The machine learning model may be trained to generate product embeddings that are close together in vector space for products that are similar and that are farther away for products that are dissimilar. The dimension of similarity may be configured to a specific problem and different machine learning models may be trained to generate product embeddings for different purposes. For example, one machine learning model may produce product embeddings based on the brand of the product, so that products from the same or a similar brand are close in vector space, while a different machine learning model may instead be configured to produce product embeddings based on the size of the product.

Once the product embeddings are generated, they may be used to find similar products. Similarity between products may be evaluated using vector distance metrics such as dot product, cosine similarity, and other metrics. Therefore, fast evaluation may be performed to compute the similarity between any product any one or more other products.

The product database 315 may be used for a variety of purposes, such as search and retrieval or hosting of a product website. In some embodiments, portions of the product database 315 may be displayed to a user.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other implementations are within the scope of the following claims.

What is claimed is:

1. A computer-implemented method for extracting content from a web page comprising:
   crawling a website to identify a plurality of product pages, the product pages comprising base product pages comprising data about a product;
   applying an unsupervised content extraction model to the product pages to identify a first set of data patterns for extracting product attributes and to distinguish product attributes from non-product information;
   filtering the first set of data patterns for extracting product attributes to create a refined second set of data patterns for extracting product attributes;
   applying the second set of data patterns for extracting raw product attributes to the product pages;
   identifying a plurality of interface elements, comprising menus and/or buttons, on the product pages;
   applying an automated process to systematically activate the plurality of interface elements on the product pages, comprising menus and/or buttons, to generate respective product page variations;
   generating differences between the product page variations, generated by systematically activating the plurality of interface elements on the product pages, comprising menus and/or buttons, and the base product pages and analyzing the generated differences to identify a plurality of raw product attribute values for each of the plurality of product attributes;
   normalizing the plurality of product attributes and normalizing the plurality of raw product attribute values, identified by analyzing the generated differences between the product page variations and the base product page, to a master list of attributes by identifying corresponding standardized attribute values, to create consistency across multiple websites;
   storing in a searchable database one or more product identifiers, product attributes, and product attribute values, identified by analyzing the generated differences between the product page variations and the base product page, and
   enabling a user to search for and review product variations using the searchable database.

2. The computer-implemented method of claim 1, further comprising:
   crawling the web site to visit a plurality of linked web pages and extract a plurality of URLs from the linked web pages;
   clustering the extracted URLs based on similarity to generate a plurality of URL clusters; generating a plurality of URL templates based on the URL clusters;
   tagging a first set of URL templates as product page URLs;
   prioritizing the product page URLs while crawling the website to identify the plurality of product pages.

3. The computer-implemented method of claim 1, further comprising:
   crawling the website to identify the plurality of product pages by using a reinforcement learning algorithm, where the reinforcement learning algorithm is rewarded for crawling a product page and penalized for visiting a non-product page.

4. The computer-implemented method of claim 1, wherein the unsupervised content extraction model is a machine learning model.

5. The computer-implemented method of claim 4, wherein the unsupervised content extraction model is trained to accept as input a plurality of HTML elements and select one of the HTML elements as a product attribute.

6. The computer-implemented method of claim 5, further comprising:
   extracting a plurality of HTML elements from a web page and extracting features from each of the HTML elements;
   inputting the extracted features to the unsupervised content extraction model to select one of the plurality of HTML elements as a product attribute.

7. The computer-implemented method of claim 1, wherein the first set of data patterns and the refined second set of data patterns for extracting product attributes comprise regular expressions.

8. The computer-implemented method of claim 1, further comprising:
   providing a master list of product attributes and attribute values and normalizing the product attributes and attributes values to the master list.

9. The computer-implemented method of claim 1, wherein the searchable database comprises a graph, the graph comprising nodes representing products and edges representing common attributes between connected nodes.

10. The computer-implemented method of claim 1, further comprising:
    training an embedding generation model to generate tensors for each product in the searchable database, where the distance between tensors represents the similarity of the products in at least one dimension.

11. A non-transitory computer-readable medium comprising instructions that when executed by a processor, cause the computer device to perform operations comprising:
    crawling a website to identify a plurality of product pages, the product pages comprising base product pages comprising data about a product;
    applying an unsupervised content extraction model to the product pages to generate a first set of patterns for extracting product attributes;
    filtering the first set of patterns for extracting product attributes to create a refined, second set of data patterns for extracting product attributes;
    applying the second set of patterns for extracting product attributes to the product pages;
    identifying a plurality of interface elements, comprising menus and/or buttons, on the product pages;
    applying an automated process to systematically activate the plurality of interface elements on the product paces, comprising menus and/or buttons, to generate product page variations;
    generating differences between the product page variations, generated by systematically activating the plurality of interface elements on the product pages, comprising menus and/or buttons, and the base product pages and analyzing the generated differences to identify a plurality of raw product attribute values for each of the plurality of product attributes;

normalizing the plurality of product attributes and normalizing the plurality of raw product attribute values, identified by analyzing the generated differences between the product page variations and the base product page, to a master set of attributes by identifying corresponding standardized attribute values;

storing in a searchable database one or more product identifiers, product attributes, and attribute values, identified by analyzing the generated differences between the product page variations and the base product page; and enabling a user to search for and review product variations using the searchable database.

12. The non-transitory computer-readable medium of claim 11, further comprising instructions for:

crawling the web site to visit a plurality of linked web pages and extract a plurality of URLs from the linked web pages;

clustering the extracted URLs based on similarity to generate a plurality of URL clusters;

generating a plurality of URL templates based on the URL clusters;

tagging a first set of URL templates as product page URLs;

prioritizing the product page URLs while crawling the website to identify the plurality of product pages.

13. The non-transitory computer-readable medium of claim 11, further comprising instructions for:

crawling the website to identify the plurality of product pages by using a reinforcement learning algorithm, where the reinforcement learning algorithm is rewarded for crawling a product page and penalized for visiting a non-product page.

14. The non-transitory computer-readable medium of claim 11, wherein the unsupervised content extraction model is a machine learning model.

15. The non-transitory computer-readable medium of claim 14, wherein the unsupervised content extraction model is trained to accept as input a plurality of HTML elements and select one of the HTML elements as a product attribute.

16. The non-transitory computer-readable medium of claim 15, further comprising instructions for:

extracting a plurality of HTML elements from a web page and extracting features from each of the HTML elements;

inputting the extracted features to the unsupervised content extraction model to select one of the plurality of HTML elements as a product attribute.

17. The non-transitory computer-readable medium of claim 11, wherein the first set of patterns and second set of patterns for extracting product attributes comprise regular expressions.

18. The non-transitory computer-readable medium of claim 11, further comprising instructions for:

providing a master list of product attributes and attribute values and normalizing the product attributes and attributes values to the master list.

19. The non-transitory computer-readable medium of claim 11, wherein the searchable database comprises a graph, the graph comprising nodes representing products and edges representing common attributes between connected nodes.

20. The non-transitory computer-readable medium of claim 11, further comprising instructions for:

training an embedding generation model to generate tensors for each product in the searchable database, where the distance between tensors represents the similarity of the products in at least one dimension.

* * * * *

UNITED STATES PATENT AND TRADEMARK OFFICE
CERTIFICATE OF CORRECTION

Page 1 of 1

PATENT NO. : 11,042,594 B2
APPLICATION NO. : 16/288059
DATED : June 22, 2021
INVENTOR(S) : Praveen Sekar It is certified that error appears in the above-identified patent and that said Letters Patent is hereby corrected as shown below:

In the Drawings

In sheet 17 of 20, FIG. 7D, reference numeral 735, Line 1, delete "css-selector" and insert -- CSS-selector --.

In the Specification

In Column 6, Line 54, delete "meta tags," and insert -- meta-tags, --.

In the Claims

In Column 12, Line 63, Claim 11, delete "paces," and insert -- pages, --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*